(12) United States Patent
Han et al.

(10) Patent No.: US 9,180,751 B2
(45) Date of Patent: Nov. 10, 2015

(54) AIR CONDITIONER FOR VEHICLE

(75) Inventors: Seongseok Han, Daejeon-si (KR);
Hyungjoo Kim, Daejeon-si (KR);
Dongmin Kam, Daejeon-si (KR);
Seonghyun Kim, Daejeon-si (KR);
Donggyun Kim, Daejeon-si (KR)

(73) Assignee: Halla Visteon Climate Control Corporation, Daejeon (KR)

( * ) Notice: Subject to any disclaimer, the term of this patent is extended or adjusted under 35 U.S.C. 154(b) by 625 days.

(21) Appl. No.: 13/571,630

(22) Filed: Aug. 10, 2012

(65) Prior Publication Data
US 2013/0045670 A1 Feb. 21, 2013

(30) Foreign Application Priority Data

Aug. 18, 2011 (KR) .................. 10-2011-0081964
Jul. 27, 2012 (KR) .................. 10-2012-0082185

(51) Int. Cl.
*B60S 1/54* (2006.01)
*B60H 1/00* (2006.01)

(52) U.S. Cl.
CPC .. *B60H 1/00692* (2013.01); *B60H 2001/00728* (2013.01)

(58) Field of Classification Search
CPC .................................. B60H 1/00692
USPC .................................. 454/121, 127
See application file for complete search history.

(56) References Cited

U.S. PATENT DOCUMENTS

| | | | |
|---|---|---|---|
| 5,885,152 A * | 3/1999 | Wardlaw ................. | 454/121 |
| 5,890,651 A * | 4/1999 | Kanda .................... | 236/49.3 |
| 6,293,339 B1 * | 9/2001 | Uemura et al. ......... | 165/203 |
| 6,508,703 B1 * | 1/2003 | Uemura et al. ......... | 454/156 |
| 6,569,009 B2 * | 5/2003 | Nishikawa et al. ..... | 454/121 |
| 7,857,041 B2 | 12/2010 | Fukagawa et al. | |
| 7,927,684 B2 * | 4/2011 | Comeaux et al. ....... | 428/137 |
| 2002/0146976 A1 | 10/2002 | Nishikawa et al. | |
| 2003/0013404 A1 * | 1/2003 | Uemura et al. ......... | 454/121 |
| 2006/0046632 A1 * | 3/2006 | Goupil et al. ........... | 454/121 |
| 2006/0046633 A1 * | 3/2006 | Goupil et al. ........... | 454/121 |
| 2007/0259614 A1 * | 11/2007 | Barnhart et al. ........ | 454/121 |
| 2009/0197517 A1 * | 8/2009 | Wang et al. ............. | 454/145 |

FOREIGN PATENT DOCUMENTS

| | | |
|---|---|---|
| CN | 1329217 C | 8/2007 |
| DE | 102005-063235 A1 | 2/2007 |
| EP | 1312494 A1 * | 5/2003 |
| FR | 2 846 599 A1 | 5/2004 |
| JP | 2003-127640 | 5/2003 |
| JP | 2007-230373 | 9/2007 |

* cited by examiner

*Primary Examiner* — Steven B McAllister
*Assistant Examiner* — Jonathan Cotov
(74) *Attorney, Agent, or Firm* — Norton Rose Fulbright US LLP

(57) ABSTRACT

The present invention relates to an air conditioner for a vehicle that includes: a mode door having a thin. plate member, solidly operating inside an air-conditioning case to control the degree of opening of a defrost vent, a face vent and floor vents, and a gear shaft, engaged with the thin plate member for its operating; and constant discharging means disposed at a rail portion. of the thin plate member and at a guide part of an air-conditioning case overlapped with the rail portion, so that air of a fixed quantity is discharged to side vents of the face vent, thereby providing a simple structure and reducing manufacturing costs because the gear holes of the rail portion and the cut portions of the guide portion serve as the constant discharging means, without a need for additional structure to constantly discharge air toward the side vent.

12 Claims, 16 Drawing Sheets

Prior Art

Prior Art

AIR CONDITIONER FOR VEHICLE

This application claims priority under 35 U.S.C. §119 from Korean Patent Application No, 10-2011-0081964 filed Aug. 18, 2011 and Korean Patent Application No. 10-2012-0082185 filed Jul. 27, 2012, each of which is incorporated herein by reference in its entirety for all purposes.

BACKGROUND OF THE INVENTION

1. Field of the Invention

The present invention relates to an air conditioner for a vehicle, and more particularly, to an air conditioner for a vehicle that includes: a mode door having a thin, plate member, which slidably operates inside an air-conditioning case to control the degree of opening of a defrost, vent, a face vent and a floor vent, and a gear shaft, which engages with the thin plate member for operating the thin plate member; and constant discharging means disposed at a rail portion of the thin plate member and at a guide part of an air-conditioning case overlapped with the rail portion, so that air of a fixed quantity is discharged to side vents of the face vent.

2. Background Art

In general, an air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the inside air or the outside air into the air conditioner, heating or cooling the introduced air, and blowing the heated or cooled air into the vehicle.

According to mounted structures of a blower unit, an evaporator unit and a heater core unit, such an air conditioner is classified into a three-piece type air conditioner where the blower unit, the evaporator unit, and the heater core unit are disposed independently, a semi-center type air conditioner where the evaporator unit and the heater core unit are embedded in an air-conditioning case and the blower unit is mounted separately, and a center-mounting type air conditioner where the three units are all embedded in the air-conditioning case.

Recently, an independent type air conditioner, which separately and independently provides air of different temperatures to a driver's seat and to a passenger's seat inside the vehicle to thereby individually heat and cool the seats according to the driver's or the passenger's need, has been disclosed.

FIG. 1 illustrates the semi-center type air conditioner. In FIG. 1, the air conditioner 1 includes: an air-conditioning case 10 having an air inflow port 11 formed on an inlet thereof and a defrost vent 12a, a face vent 12b and floor vents 12c and 12d mounted on an outlet thereof in such a way as to be adjusted in degree of openings by mode doors 16; a blower (not shown) connected to the air inflow port 11 of the air-conditioning case 10 for sending inside air or outside air; an evaporator 2 and a heater core 3 that are mounted on air passageways in the air-conditioning case 10; and a temperature-adjusting door 15 mounted between the evaporator 2 and the heater core 3 for adjusting the degree of opening of a cold air passageway P1, which bypasses the heater core 3, and a warm air passageway P2, which passes through the heater core 3.

Furthermore, the floor vents 12c and 12d are divided into a floor vent 12c for a front seat and a floor vent 12d for a rear seat.

In addition, the face vent 12b includes a center vent for discharging air toward the center of the inside of the vehicle, and side vents formed at both sides of the center vent for discharging air toward both sides of the inside of the vehicle.

Moreover, the temperature-adjusting door 15 and the mode doors 16 respectively include rotary shafts 15b and 16b rotatably mounted on both sides of the air-conditioning case 10 and plates 15a, 16a and 16b formed at one side of the rotary shafts 15b and 16b. In this instance, for the mode door 16, a center pivot door having the plates 16a and 16c formed at both sides of the rotary shaft 16b may be used.

The temperature-adjusting door 15 and the mode doors 16 are respectively connected to a cam (not shown) or a lever (not shown), which is actuated by an actuator (not shown) mounted on an outer surface of the air-conditioning case 10, and rotatably operated to thereby adjust the degree of opening of the cold and warm air passageways P1 and P2 or open or close the vents 12a to 12d.

According to the air conditioner 1 having the above structure, in the case of the greatest cooling mode, the temperature-adjusting door 15 opens the cold air passageway P1 and closes the warm air passageway P2. Accordingly, the air blown by a blower (not shown) is converted into cold air by heat-exchanging with refrigerant flowing inside the evaporator 2 while passing through the evaporator 2, and then, flows toward a mixing chamber (MC) through the cold air passageway P1. After that, the converted air is discharged to the inside of the vehicle through the vents 12a to 12d opened by a predetermined air-conditioning mode, whereby the inside of the vehicle is cooled.

Moreover, in the case of the greatest heating mode, the temperature-adjusting door 15 closes the cold air passageway P1 and opens the warm air passageway P2. Accordingly, the air blown by the blower (not shown) passes through the evaporator 2, is converted into warm air by heat-exchanging with cooling water flowing inside the heater core 3 while passing through the heater core 3 through the warm air passageway P2, and then, flows toward the mixing chamber (MC). After that, the converted air is discharged to the inside of a vehicle through the vents 12a to 12d opened by the predetermined air-conditioning mode, whereby the inside of the vehicle is heated.

In the meantime, in the case of not the greatest cooling mode but a half cooling mode, the temperature-adjusting door 15 is rotated to a neutral position, and opens all of the cold air passageway P1 and the warm air passageway P2 relative to the mixing chamber (MC). Accordingly, the cold air passing through the evaporator 2 and the warm air passing through the heater core 3 flow toward the mixing chamber (MC) and are mixed with each other, and then, are discharged to the inside of the vehicle through the vents 12a to 12d opened by the predetermined air-conditioning mode.

Furthermore, there are three mode doors 16 for opening and closing the defrost vent 12a, the face vent 12b and the floor vents 12c and 12d. In this instance, as shown in FIG. 2, in the case of the mode door 16 for opening and closing the face vent 12b, the plate 16c for opening and closing the side vent of the face vent 12b is formed so small as not to completely close the side vents, so that air of a fixed quantity is discharged to the side vents of the face vent 12b without regard to any air discharge mode in order to defrost windows of the vehicle.

However, in order to constantly discharge air of a fixed quantity to the side vents of the face vent 12b, the plates 16c formed at both ends must be formed smaller than the plate 16a formed at the center of the mode door 16.

Additionally, in the case that the three mode doors 16 are mounted to open and close the defrost vent 12a, the face vent 12b and the floor vents 12c and 12d, there is no problem because only the end plates 16c of the mode door 16 for opening and closing the side vents of the face vent 12b is formed smaller.

In addition, in the air conditioner using one or two mode doors in order to open and close the defrost vent 12a, the face vent 12b and the floor vents 12c and 12d, in the case that the end plates 16c of the mode door are formed smaller, it causes a deterioration in air-conditioning performance because air of a predetermined amount leaks toward the defrost vent 12a or the floor vents 12c and 12d.

SUMMARY OF THE INVENTION

Accordingly, the present invention has been made to solve the above-mentioned problems occurring in the prior arts, and it is an object of the present invention to provide an air conditioner for a vehicle that includes: a mode door having a thin plate member, which slidably operates inside an air-conditioning case to control the degree of opening of a defrost vent, a face vent and floor vents, and a gear shaft, which engages with the thin plate member for operating the thin plate member; and constant discharging means disposed at a rail portion of the thin plate member and at a guide part of an air-conditioning case overlapped with the rail portion, so that air of a fixed quantity is discharged to side vents of the face vent, thereby providing a simple structure and reducing manufacturing costs because the gear holes of the rail portion and the cut portions of the guide portion, which are the constant discharging means, can be used as a constant discharge structure without needing additional structure to constantly discharge air toward the side vent, enhancing an air-conditioning performance because air is constantly discharged only toward the side vent and does not leak to the defrost vent and the floor vents even though the single thin plate member is used to realize the air discharge mode, and reducing weight and manufacturing costs and preventing a bad smell due to inhabitation of molds because the thin plate member is used.

To accomplish the above object, according to the present invention, there is provided an air conditioner for a vehicle including: an air-conditioning case having an air inflow port formed on one side thereof and a defrost vent, a face vent and floor vents respectively formed on the other side thereof for discharging the air, which is introduced through the air inflow port; a mode door having a gear shaft, which is rotatably mounted inside the air-conditioning case and has gear portions, and a thin plate member, which is slidably mounted adjacent to the vents inside the air-conditioning case and has rail portions engaging with the gear portions of the gear shaft, for controlling the degree of opening of the vents; a guide part formed on an inner face of the air-conditioning case to cover the rail portions and overlapped with the rail portions of the thin plate member; and constant discharging means formed on the rail portions of the mode door and the guide part of the air-conditioning case so as to constantly discharge the inside air of the air-conditioning case toward one vent out of the vents.

The air conditioner for the vehicle according to the present invention includes: the mode door having the thin plate member, which slidably operates inside the air-conditioning case to control the degree of opening of the defrost vent, the face vent and floor vents and the gear shaft, which engages with the thin plate member for operating the thin plate member; and constant discharging means having cut portions formed in a predetermined section of the guide part of the air-conditioning case formed to cover the gear holes of the thin plate member, so that air of a fixed quantity is discharged to the side vents of the face vent, whereby the present invention can simplify the structure and reduce manufacturing costs because the gear holes of the thin plate member opened by the cut portion of the guide part can be used as the constant discharge structure without needing additional structure for constantly discharging air toward the side vents.

Moreover, because the cut portion is formed only at the guide part of the side vent and the gear holes of the thin plate member are opened by the cut portion, even in the case that the single thin plate member 150 is used to realize the air discharge mode, air is constantly discharged only toward the side vents, but does not leak to the defrost vent or the floor vents, so as to enhance the air-conditioning performance.

Furthermore, the present invention can reduce the number of components, weight and manufacturing costs, enhance durability and reduce the size of the air conditioner owing to the overall simple structure because the mode door includes the single thin plate member and the gear shaft, and prevent bad smells caused by inhabitation of molds since the thin plate member is used.

Additionally, because the cut portion is formed on the guide part, when a sliding type mode door is adopted, the present invention can reduce a flow path resistance and increase air volume since the cut portion of the guide part can solve the problems of the flow path resistance and reduction of air volume.

In addition, the present invention can provide a compact-size door and a compact-size air-conditioning case because the gear holes formed in the rail portions of the thin plate member are utilized for transferring power in order to provide a constant discharge function.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
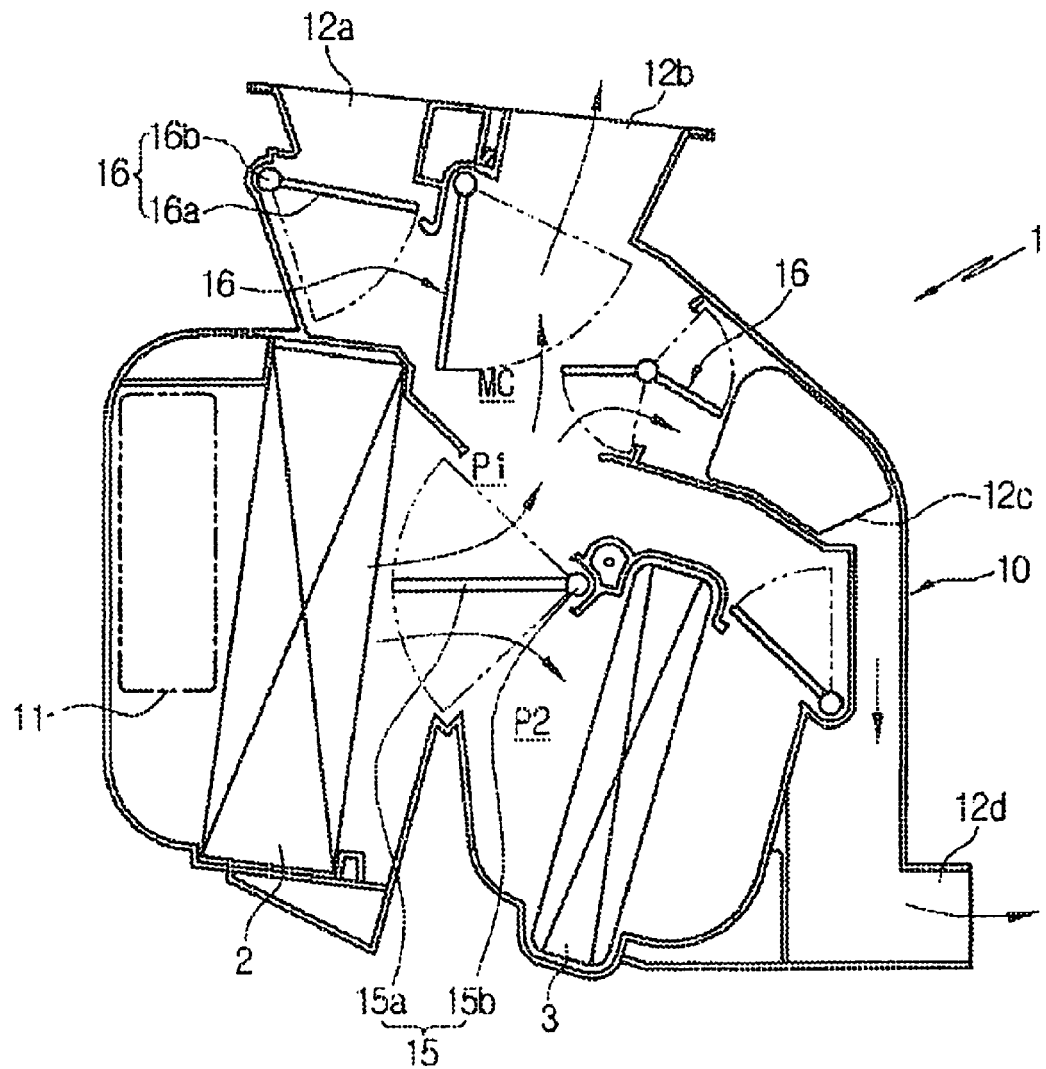
FIG. 1 is a sectional view showing an air conditioner for a vehicle according to a prior art.
Figure 2:
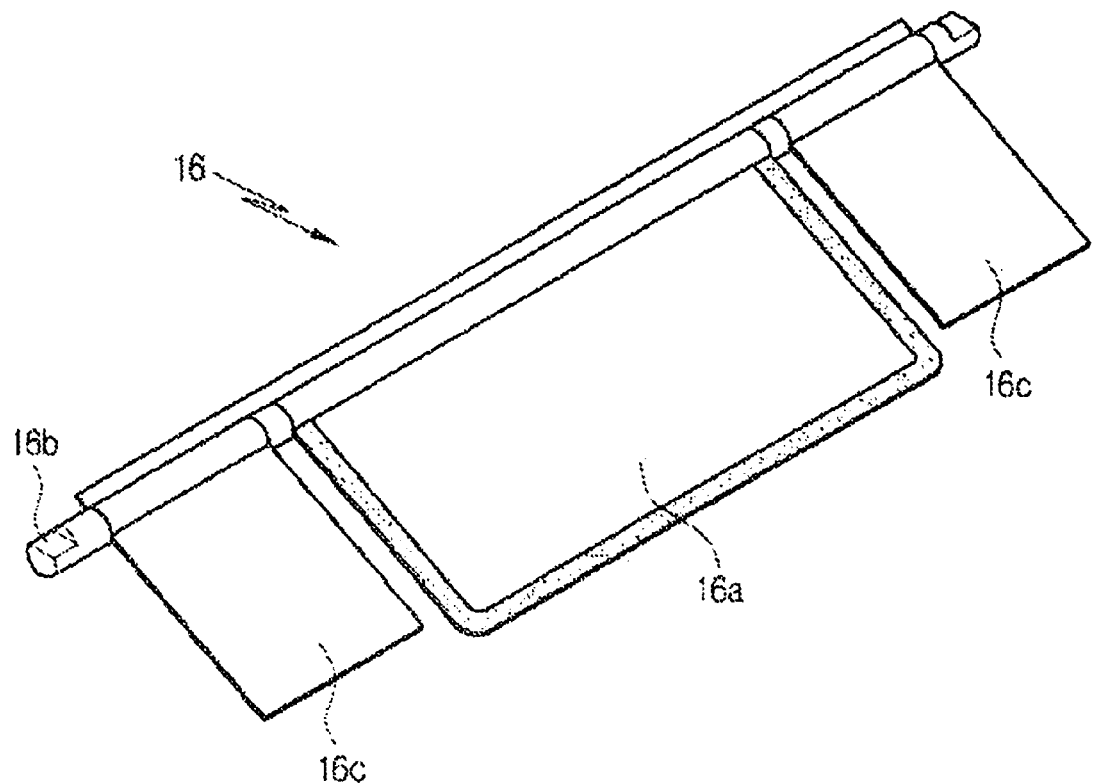
FIG. 2 is a perspective view showing mode doors in FIG. 1.
Figure 3:
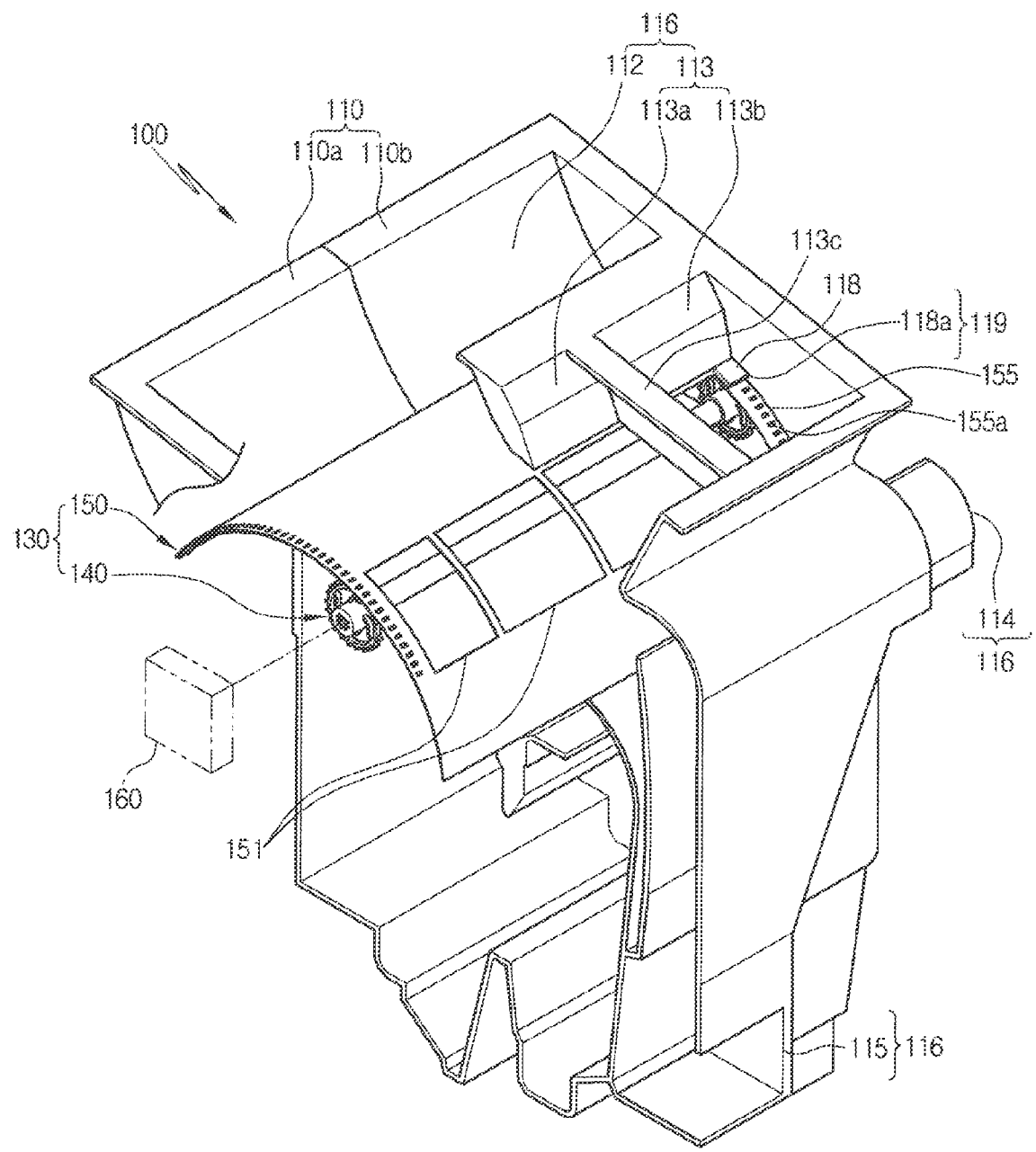
FIG. 3 is a perspective view showing the inside of an air-conditioning case of an air conditioner for a vehicle according to the present invention.

Reference will be now made in detail to the preferred embodiment of the present invention with reference to the attached drawings.

As shown in the drawings, an air conditioner 100 for a vehicle according to the present invention includes: an air-conditioning case 110 having an air inflow port 111 formed on one side (inlet side) thereof and a plurality of air outflow ports 116 formed on the other side (outlet side) thereof for discharging the air, which is introduced through the air inflow port 111; an evaporator 101 and a heater core 102 mounted on an air passageway 110c inside the air-conditioning case 110 and spaced apart from each other at a predetermined interval; a temperature-adjusting door 120 mounted on the air passageway 110c between the evaporator 101 and the heater core 102 inside the air-conditioning case 110 in order to control the degree of opening of a cold air passageway P1, which bypasses the heater core 102, and a warm air passageway P2, which passes through the heater core 102; and mode doors 130 respectively mounted on the air outflow ports 116 inside the air-conditioning case 110 for adjusting the degree of opening of the plural air outflow ports 116.

Moreover, the air-conditioning case 110 is constructed by assembly of left and right cases 110a and 110b formed separately.

Furthermore, a blower (not shown) is mounted on the air inflow port 111 of the air-conditioning case 110 to selectively introduce and blow the inside air or the outside air through an inside air inlet (not shown) or an outside air inlet (not shown), which is opened and closed by an inside and outside air converting door (not shown).

Additionally, the plural air outflow ports 116 are a defrost vent 112 for discharging the air toward the front window of the vehicle, a face vent 113 for discharging the air toward the face of a passenger, who sits on the front seat, and floor vents 114 and 115 for discharging the air toward the passenger's feet, and the defrost vent 112, the face vent 113 and the floor vents 114 and 115 are formed in order.

The face vent 113 is divided into a center vent 113a and side vents 113b, namely, includes the center vent 113a formed at the center of the inside of the face vent 113 for discharging air toward the center of the inside of the vehicle, and the side vents 113b formed at both sides of the center vent 113a for discharging air toward both sides of the inside of the vehicle. In this instance, the center vent 113a and the side vents 113b are divided from each other by a plurality of partitions 113c.

The floor vents 114 and 115 are divided into a floor vent 114 for the front seat to discharge the air toward the feet, of the passenger, who sits on the front seat, and another floor vent 115 for the rear seat to discharge the air toward the feet of the passenger, who sits on the rear seat.

In the meantime, a partitioning wall 117 is formed between the warm air passageway P2 at the rear of the heater core 102 and the floor vents 114 and 115 to partition them from each other.

In addition, the temperature-adjusting door 120 and the mode doors 130 are connected to an actuator 160 mounted on the outer surface of the air-conditioning case 110 and rotationally operated to control the degree of opening of the warm and cold air passageways P1 and P2 and the vents 112 to 115.

The mode door 130 includes a gear shaft 140 and a thin plate member 150.

The gear shaft 140 is rotatably mounted inside the air-conditioning case 110 and has gear portions 141 respectively formed at both end portions thereof. In this instance, end portions of the gear shaft 140, which are located more outward than the gear portions 141, are rotatably joined to both inner sides of the air-conditioning case 110.

Here, it is preferable that the gear shaft 140 is arranged below the face vent 113 out of the plural air outflow ports 116. That is, the gear shaft 140 is arranged below the face vent 113, which is located at the center of a movement path of the thin plate member 150 slidably moving between the defrost vent 112 and the floor vents 114 and 115 so as to stably support the thin plate member 150 through the whole air discharge mode.

The thin plate member 150 is slidably mounted adjacent to the vents 112 to 115 inside the air-conditioning case 110, and opens and closes the vents 112 to 115 while slidably operating in engagement with the gear portions 141 of the gear shaft 140.

The thin plate member 150 includes rail portions 155, which is disposed at both end portions thereof and has a plurality of gear holes 155a and 155b to engage with the gear portions 141 of the gear shaft 140.

In this instance, the rail portions 155 having the plural gear holes 155a and 155b are formed at both end portions of the thin plate member 150 in a sliding direction of the thin plate member 150.

Figure 11:
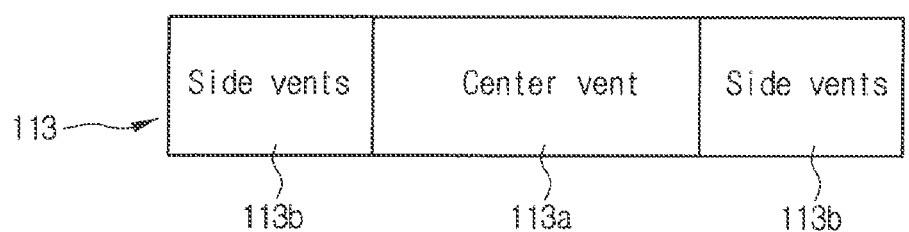
FIGS. 11 and 12 are views showing an arrangement structure of a center vent and side vents in a face vent.
Figure 12:
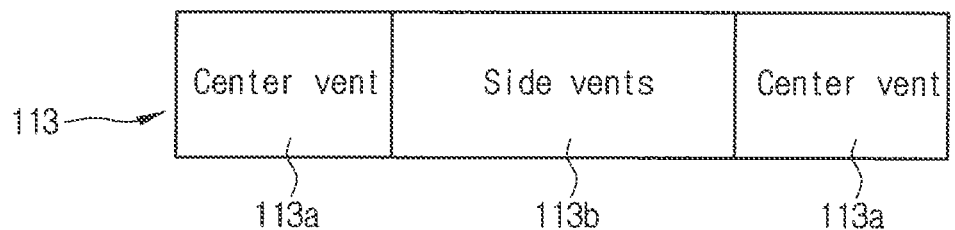

In the meantime, as shown in FIG. 11, in the case that the center vent 113a is disposed at the center of the inside of the face vent 113 and the side vents 113b are disposed at both sides of the center vent 113a, as described above, the rail portions 155 are formed at both end portions of the thin plate member 150. However, as shown in FIG. 12, in the case that the side vent 113b is disposed at the center of the inside of the face vent 113 and the center vents 113a are disposed at both sides of the side vent 113b, the rail portions 155 are formed at both sides of the side vent 113b.

Here, in the structure of the face vent 113 shown in FIG. 12, the gear portions 141 and a guide part 118, which will be described later, as well as the rail portions 155, are located at both sides of the side vent 113b.

Moreover, a rail groove portion 156 is formed in an inner face of the air-conditioning case 110, which faces the rail portion 155 of the thin plate member 150, in the sliding direction of the thin plate member 150 so as to slidably support an end portion of the rail portion 155.

Figure 8:
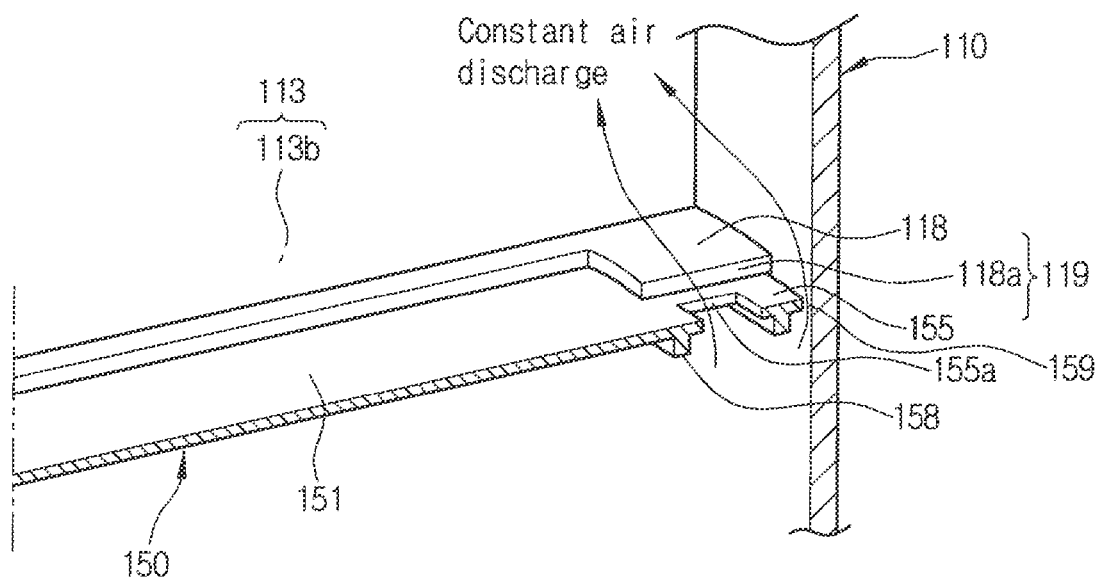
FIG. 8 is a sectional view taken along the line of A-A of FIG. 7.
Figure 9:
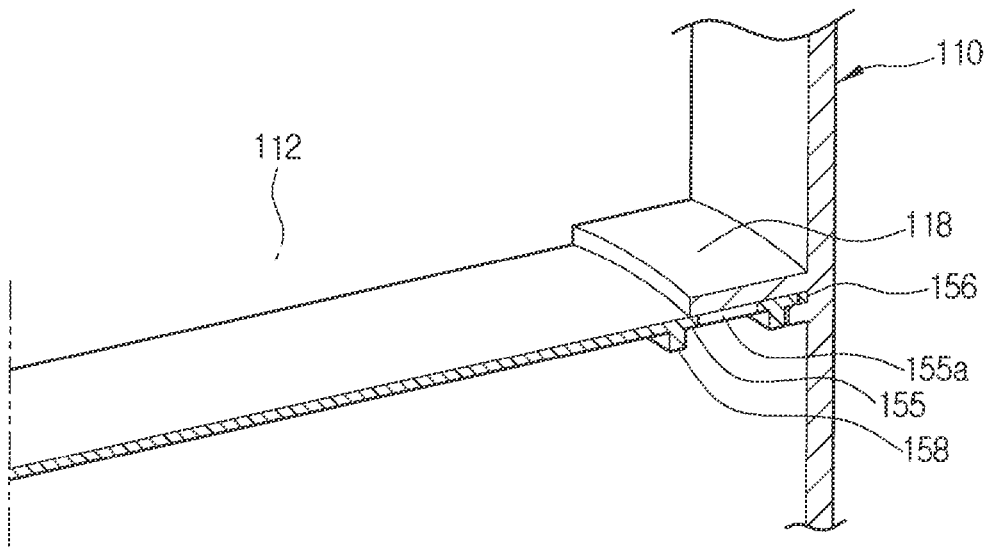
FIG. 9 is a sectional view taken along the line of B-B of FIG. 7.

Here, the rail groove portions 156 extend along both sides of the plural air outflow ports 116 inside the air-conditioning case 110, and in this instance, it is preferable that the rail groove portions 156 are formed in the defrost vent 112 and the floor vent 114 as shown in FIG. 9, but are not formed in the face vent 113 as shown in FIG. 8. In other words, because the side vent 113b of the face vent 113 has to constantly discharge air, in the case that the rail groove portions 156 are omitted, air can be constantly discharged also through a space between the rail portion 155 of the thin plate member 150 and the inner face of the air-conditioning case 110.

In other words, a gap 159 is formed between the inner face of the air-conditioning case 110 and the rail portion 155, the inside air of the air-conditioning case 110 is constantly discharged also through the gap 159 and a cut portion 118a, which will be described later.

Figure 10:
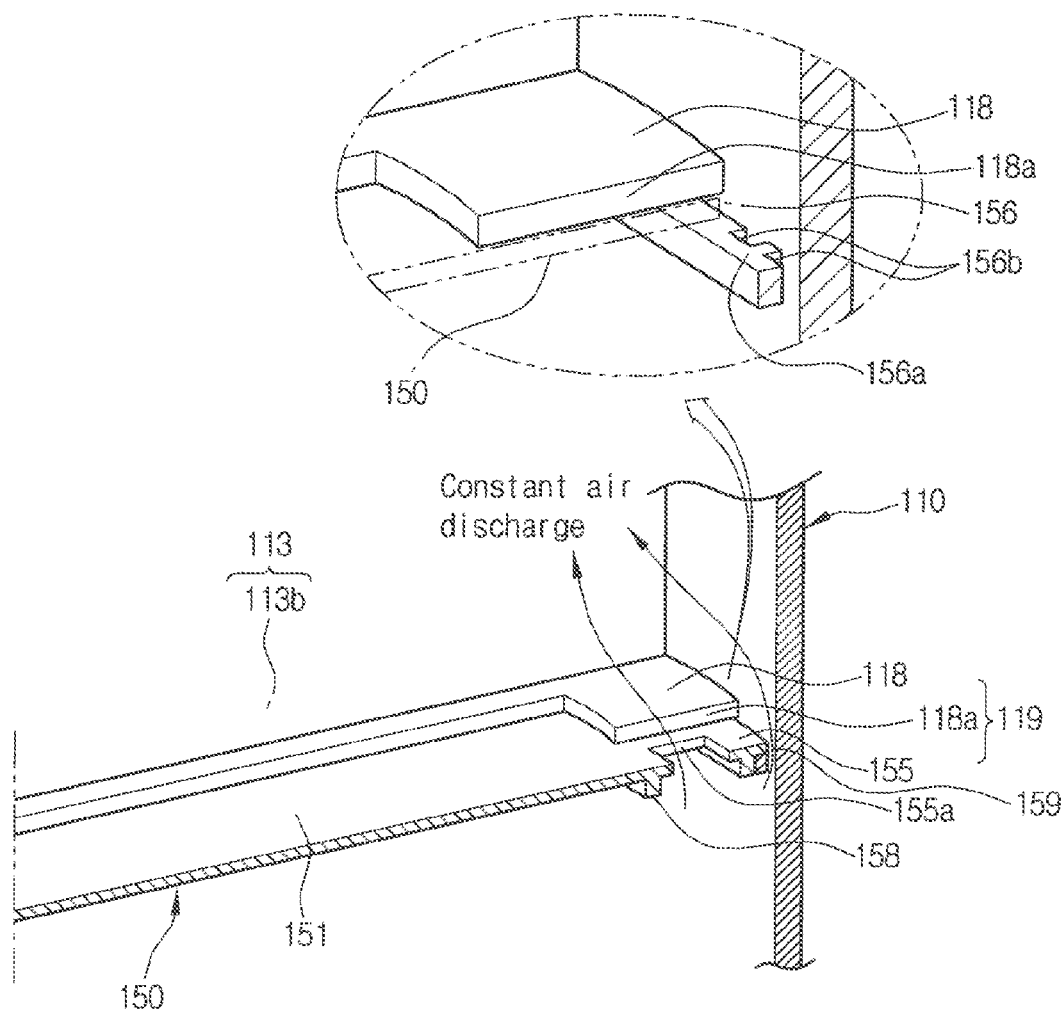
FIG. 10 is a sectional view showing another embodiment of FIG. 8.

Meanwhile, it is preferable that the rail groove portion 156 is formed only on an outer area of the cut portion 118a, but as shown in FIG. 10, the rail groove portion 156 may be formed also on an inner area of the cut portion 118a, and in this case, a through hole 156b is formed in a side 156a of the rail groove portion 156 corresponding to the inner area of the cut portion 118a, so that the inside air of the air-conditioning case 110 can be constantly discharged also through the through hole 156b, the gap 159 and the cup portion 118a.

In FIG. 10, a lower side 156a of the rail groove portion 156 corresponding to the inner face of the cut portion 118a is opened by the through hole 156b, and an upper side of the rail groove portion is opened by the cut portion 118a.

Furthermore, because the air-conditioning case 110 is constructed by assembly of the left and right cases 110a and 110b, the rail groove portions 156 are respectively formed on the inner faces of the left and right cases 110a and 110b facing rail portions 155 of the thin plate member 150.

Thereby, the thin plate member 150 of the mode door 130 are supported between the rail groove portions 156 respectively formed on the left and right cases 110a and 110b.

Additionally, the thin plate member 150 and the rail groove portions 156 are formed to have the same radius, and the thin plate member 150 is mounted in contact with the vents 112 to 115 inside the air-conditioning case 110.

Accordingly, when the gear shaft 140 is rotated, the thin plate member 150 can open and close the vents 112 to 115 while slidably operating along the rail groove portion 156.

Moreover, because the thin plate member 150 and the rail groove portions 156 are formed to have the same radius, namely, the same curvature, it prevents that the thin plate member 150 is transformed when the thin plate member 150 is slidably operated.

It is preferable that the thin plate member 150 is injection-molded of plastic material and is formed as thin as possible unless there is no problem on operation and durability.

Furthermore, the thin plate member 150 includes: an opening portion 154 for selectively opening the face vent 113 according to the air discharge mode; a first door portion 151 disposed at one side of the opening portion 154 for selectively closing the face vent 113; and a second door portion 152 disposed at the other side of the opening portion 154 for selectively closing the floor vents 114 and 115.

In this instance, the first door portion 151 and the second door portion 152 are spaced apart from each other in the sliding direction of the thin plate member 150, and are connected integrally with each other through a bridge portion 153.

As described above, because the present invention uses the single thin plate member 150, the present invention can reduce the number of components and weight and manufacturing costs due to a simple overall structure of the mode door 130, enhance durability, reduce the size of the air conditioner 100, and prevent smell caused by inhabitation of molds and is reusable.

Furthermore, the gear holes 155a and 155b are respectively formed on sides of the first door portion 151 and the opening portion 154, but the gear hole is not formed on the side of the second door portion 152.

Additionally, the first door portion 151 is formed to close at least two vents out of the defrost vent 112, the face vent 113 and the floor vents 114 and 115. That is, the first door portion 151 is as long in the sliding direction as to simultaneously close two adjacent vents out of the vents 112 to 115, and of course, when the first door portion 151 slides to the maximum in the counterclockwise direction, only one vent, namely, the defrost vent 112 is closed.

Here, it is preferable that the first door portion 151 is as big as to simultaneously close the defrost vent 112 and the face vent 113 or to simultaneously close the face vent 113 and the floor vents 114 and 115.

Moreover, the second door portion 152 is formed to close at least one out of the vents 112 to 115.

In other words, the second door portion 152 is as long in the sliding direction as to close one of the vents 112 to 115, and in this instance, it is preferable that the second door portion 152 has a size to close the floor vents 114 and 115.

As described above, the sliding direction length of the first door portion 151, which can close two vents out of the vents 112 to 115 is longer than the sliding direction length of the second, door portion 152, which can close one of the vents 112 to 115.

Meanwhile, the bridge portions 153 to integrally connect the first door portion 151 and the second door portion 152 with each other are respectively formed at positions corresponding to a plurality of partition walls 113c formed to partition the center vent 113a and the side vent 113b inside the face vent 113.

Furthermore, the opening portion 154 of the thin plate member 150 is formed between the first door portion 151 and the second door portion 152 so as to open at least one of the vents 112 to 115 according to the sliding position of the thin plate member 150.

The opening portions 154 are formed by the bridge portion 153, which connects the first door portion 151 and the second door portion 152 with each other, and are separately formed between a plurality of the bridge portions 153.

In the meantime, it is preferable that the opening portion has a size to open one vent, and in this instance, in the case that the opening portions 154 respectively span the two vents, they can respectively open the two vents partially.

Additionally, a pair of guide ribs 158 for guiding that the gear portions 141 smoothly engage with the gear holes 155a and 155b formed in the rail portions 155 are protrudingly formed on one side of the rail portions 155 of the thin plate member 150 facing the gear portions 141 of the gear shaft 140.

In this instance, a pair of the guide ribs 158 are spaced apart from each other at a predetermined interval, namely, are formed at both sides of the gear holes 155a and 155b in a longitudinal direction of the rail portions 155.

Therefore, the gear portions 141 of the gear shaft 140 are inserted between a pair of the guide ribs 158 so as to smoothly engage with the gear portions 141.

Moreover, the guide parts 118 overlapped with the rail portions 155 to cover the rail portions 155 of the thin plate member 150 are formed on the inner face of the air-conditioning case 110 at one side of the rail groove portions 156.

Accordingly, the guide part 118 is closely overlapped to one side of the rail portion 155 of the thin plate member 150 to close the gear holes 155a and 155b of the thin plate member 150, so that the guide part 118 prevents air from leaking through the gear holes 155a and 155b perforating the thin plate member 150.

In the meantime, the guide part 118 is located at the opposed side of the gear shaft 140 relative to the thin plate member 150 so as not to be interfered with the gear portion 141 of the gear shaft 140. That is, the gear shaft 140, the thin plate member 150 and the guide part 118 are arranged in order in the air flow direction inside the air-conditioning case 110.

Furthermore, the thin plate member 150 gets in contact with the guide part 118 of the air-conditioning case 110 by wind pressure of the air flowing inside the air-conditioning case 110 to thereby prevent an air leakage.

Additionally, constant discharging means 119 are formed on the rail portion 155 of the mode door 130 and the guide part 116 of the air-conditioning case 110 so as to constantly discharge the inside air of the air-conditioning case 110 toward one out of the defrost vent 112, the face vent 113 and the floor vents 114 and 115.

The constant discharging means 119 includes: a plurality of the gear holes 155a and 155b formed on the rail portion 155 of the mode door 130 to engage with the gear portion 141 of the gear shaft 140; and the cut portion 118a formed on the guide part 118 of the air-conditioning case 110 by cutting a predetermined section of the guide part 118 in the sliding direction of the thin plate member 150, wherein the air passing through the gear holes 155a and 155b and the cut portion 118a is constantly discharged toward one vent.

Here, the one vent is the face vent 113, and more particularly, the side vent 113b of the face vent 113.

In addition, the cut portions 118a are formed on the guide parts 118 respectively formed at both side vents 113b of the face vent 113.

That is, the gear holes 155a and 155b formed on both end rail portions 155 of the thin plate member 150 are covered and closed by the guide part 118 at the defrost vent 112 and the floor vents 114 and 115 as shown in FIG. 9, but are opened by the cut portion 118a at the side vents 113b of the face vent 113, on which the cut portion 118a is located, as shown in FIG. 8.

Therefore, without regard to any air discharge mode, air is constantly discharged through the gear holes 155a and 155b of the thin plate member 150 and the cut portion 118a only toward the side vents 113b of the face vent 113.

As described above, without needing to construct additional discharge structure on the thin plate member 150 in order to constantly discharge air toward the side vent 113b of the face vent 113, the gear holes 155a and 155b originally formed on the thin plate member 150 are used as a constant discharge structure, so that manufacturing costs can be reduced due to a simple structure.

Moreover, even in the case that the single thin plate member 150 is used, air is constantly discharged only toward the side vents 113b of the face vent 113, but does not leak to the defrost vent 112 or the floor vents 114 and 115, so as to enhance the air-conditioning performance.

Furthermore, at the side vents 113b of the face vent 113, air is constantly discharged not only through the gear holes 155a and 155b of the rail portion 155 of the thin plate member 150 but also through the space between the end portion of the rail portion 155 and the inner face of the air-conditioning case 110 by the cut portion 118a formed on the guide part 118.

In the meantime, the rail portions 155 formed at both end portions of the second door portion 152 do not have the gear holes, namely, because the second door portion 152 does not go to the face vent 113, there is no need to form the gear holes in the rail portions 155 of the second door portion 152 to constantly discharge air.

Figure 4:
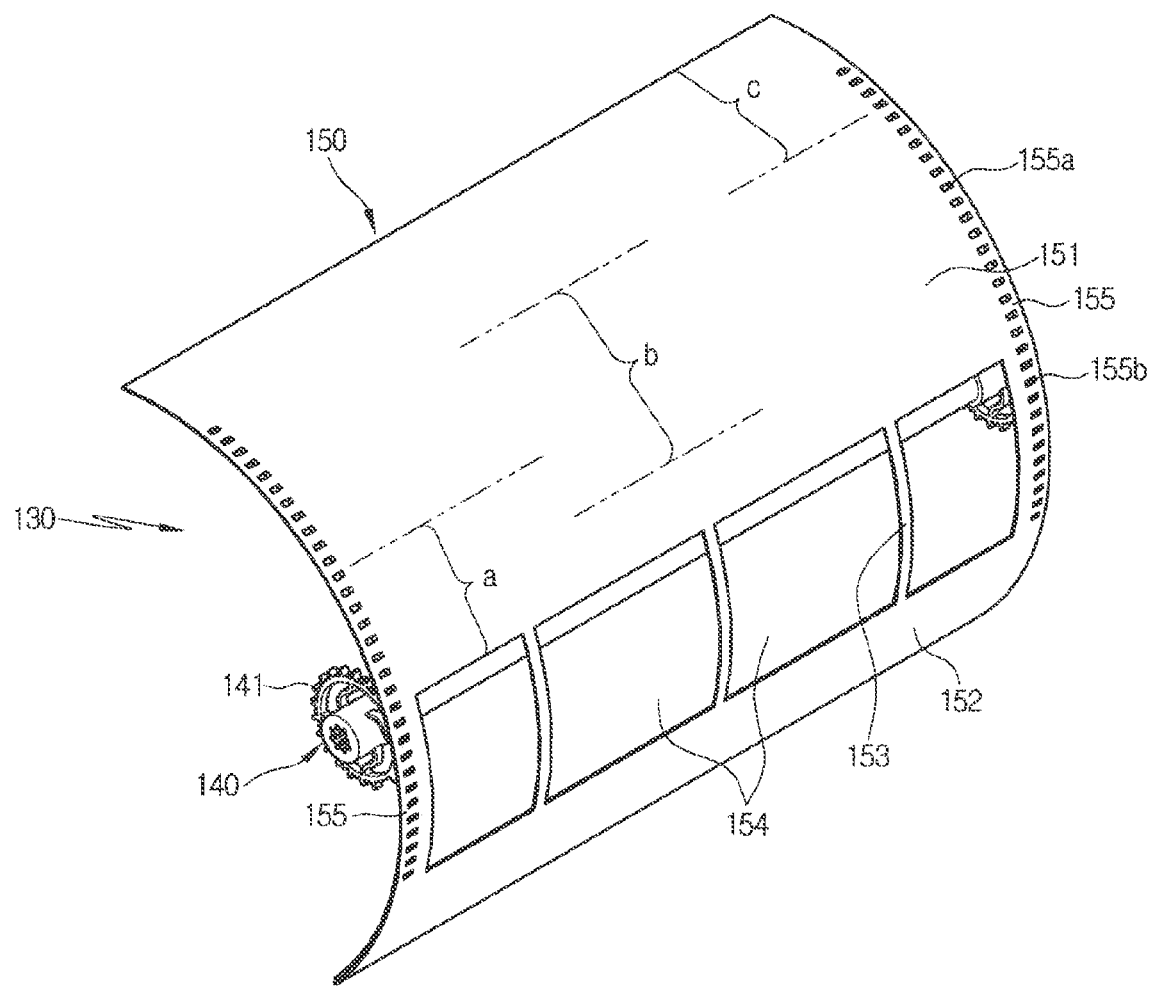
FIGS. 4 to 6 are perspective views showing mode doors in the air conditioner for the vehicle according to the present invention.
Figure 14:
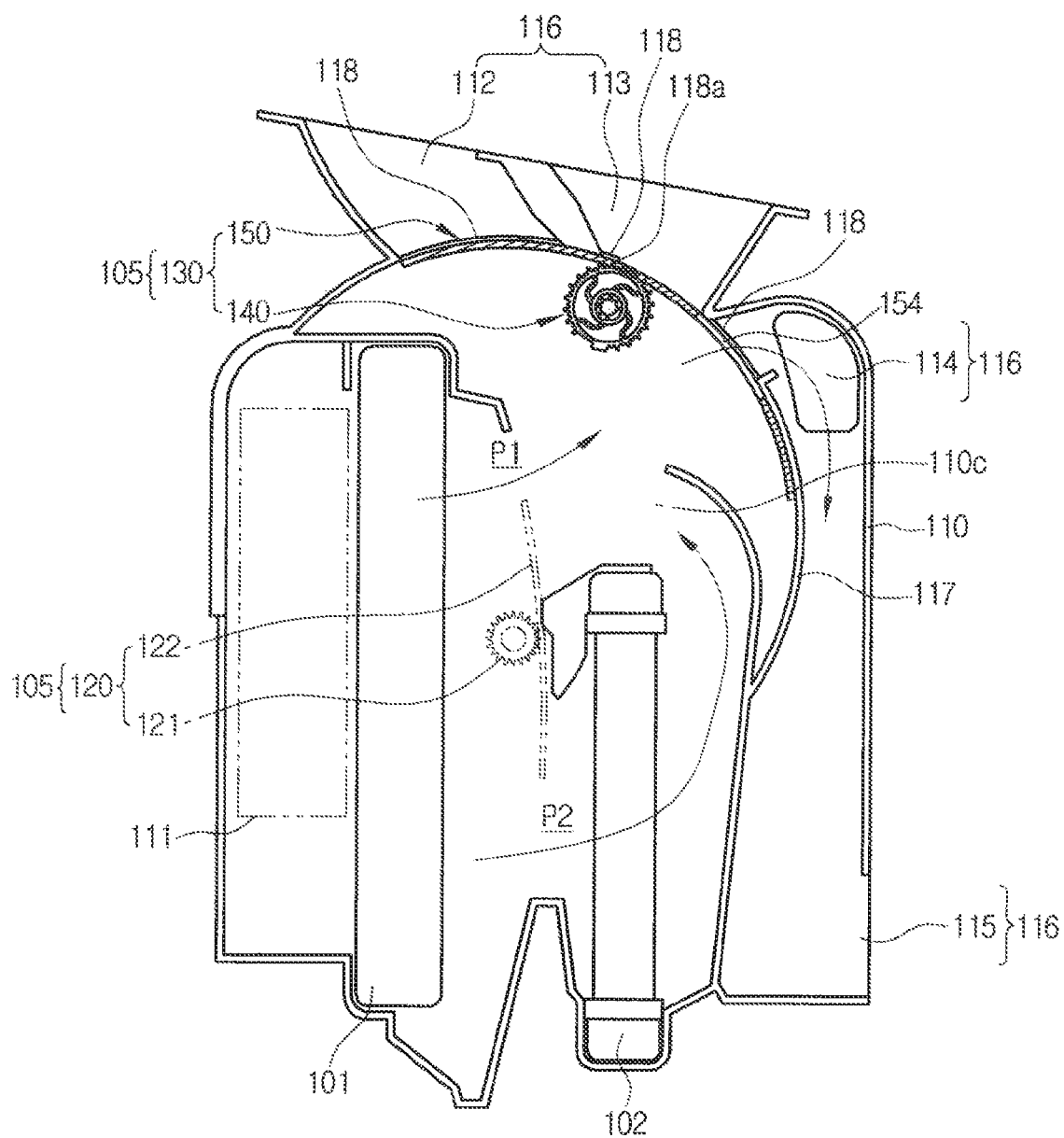
Figure 15:
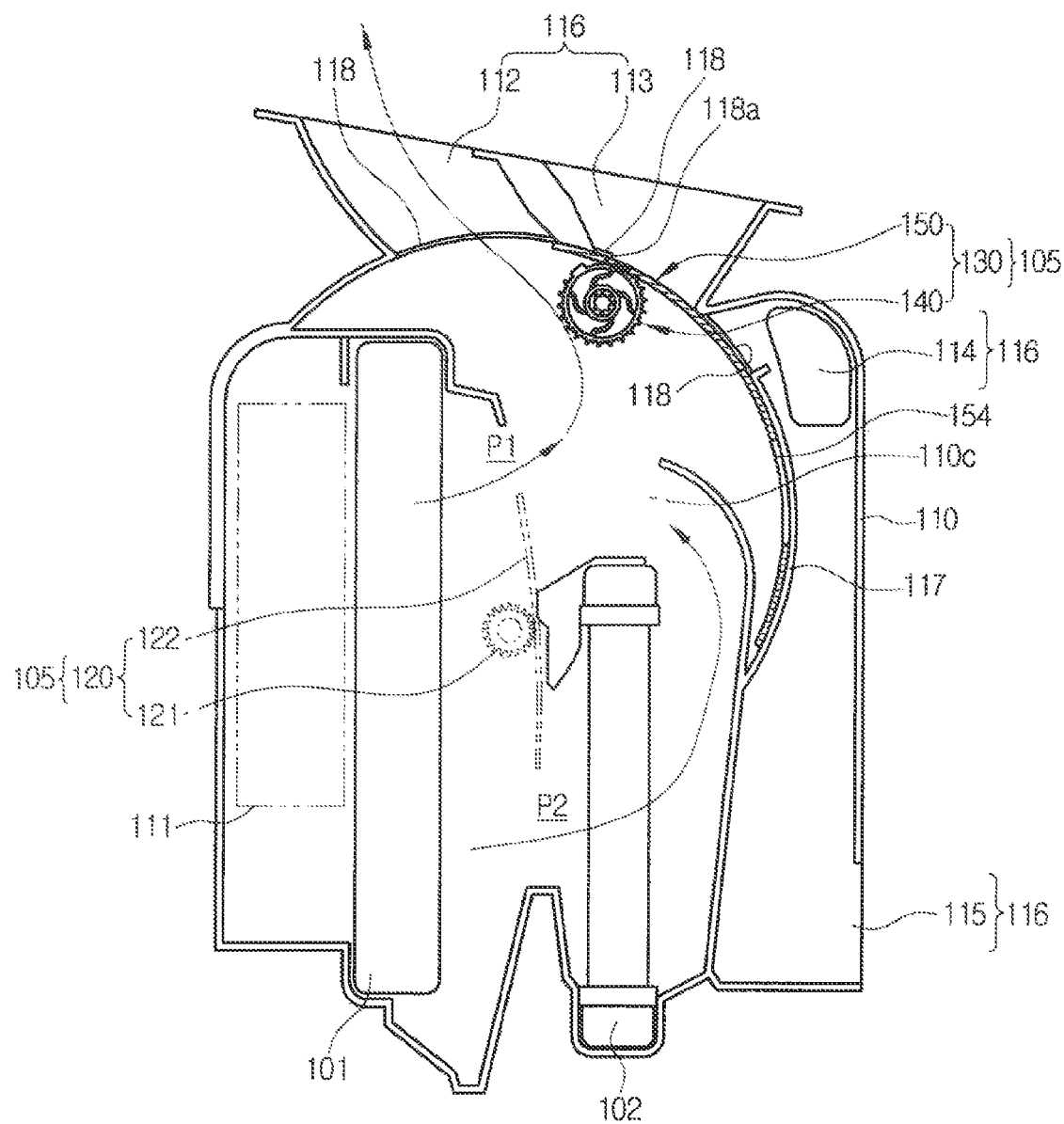
Figure 17:
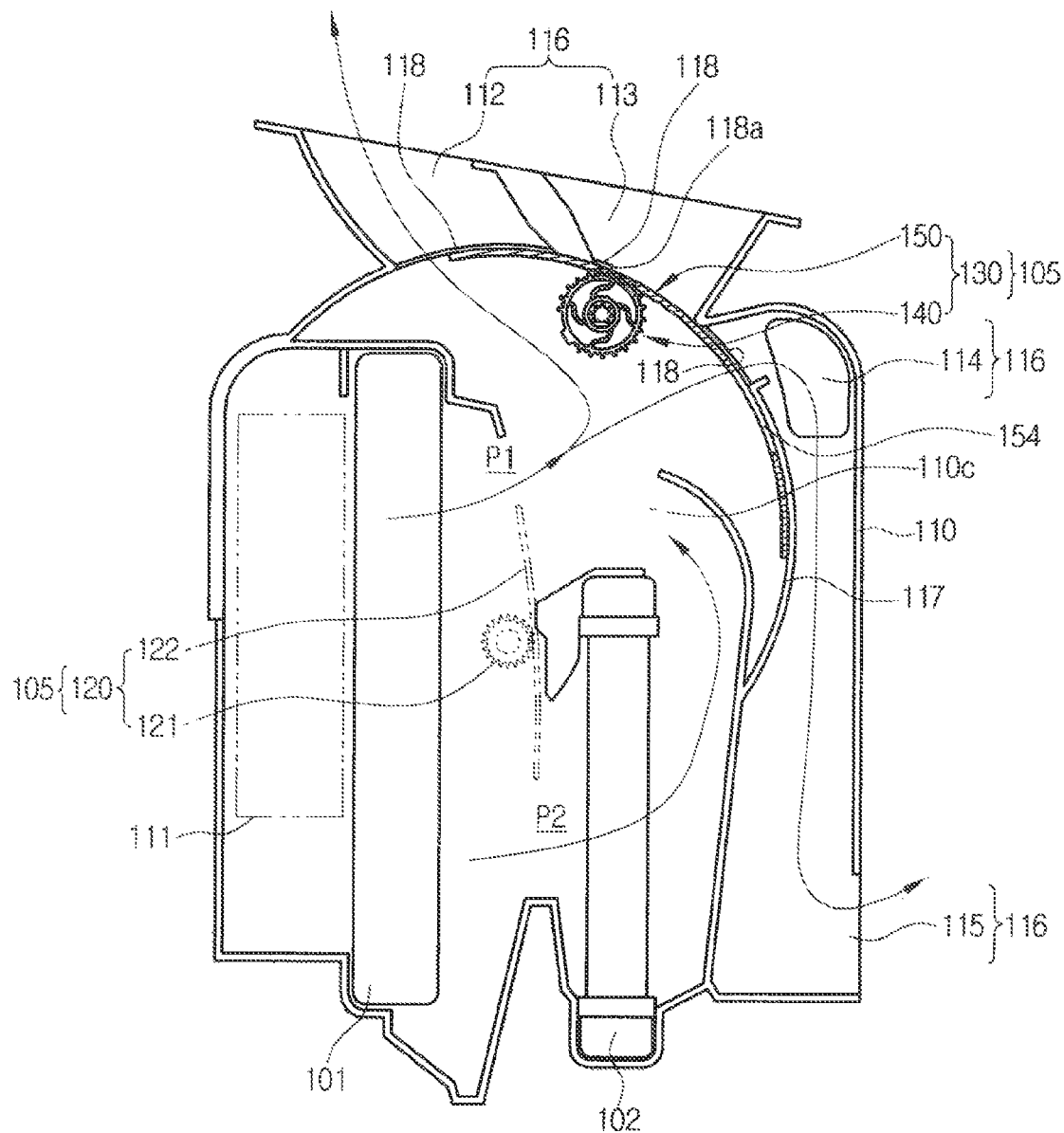

Additionally, as shown in FIG. 4, at the first door portion 151, an area to close the face vent 113 is changed according to the air discharge mode. Referring to FIG. 4, an "a" area of the first door portion 151 closes the face vent 113 in a floor mode as shown in FIG. 14, a "b" area closes the face vent 113 in a mix mode as shown in FIG. 17, and a "c" area closes the face vent 113 in a defrost mode as shown in FIG. 15.

In other words, in the air discharge mode that the first door portion 151 closes the face vent 113, the gear hole 155a formed on the rail portion 155 of the first door portion 151 must serve to transfer power by engaging with the gear portion 141 of the gear shaft 140 and serve as a flow passageway during the constant air discharge.

In addition, because air can be discharged toward the face vent 113 by the opening portion 154 in the air discharge mode (the face mode and a bi-level mode) that the opening portion 154 opens the face vent 113, it is good that the gear hole 155b formed on the rail portion 155 of the opening portion 154 serves only the power transfer function by engaging with the gear portion 141 of the gear shaft 140.

Figure 5:
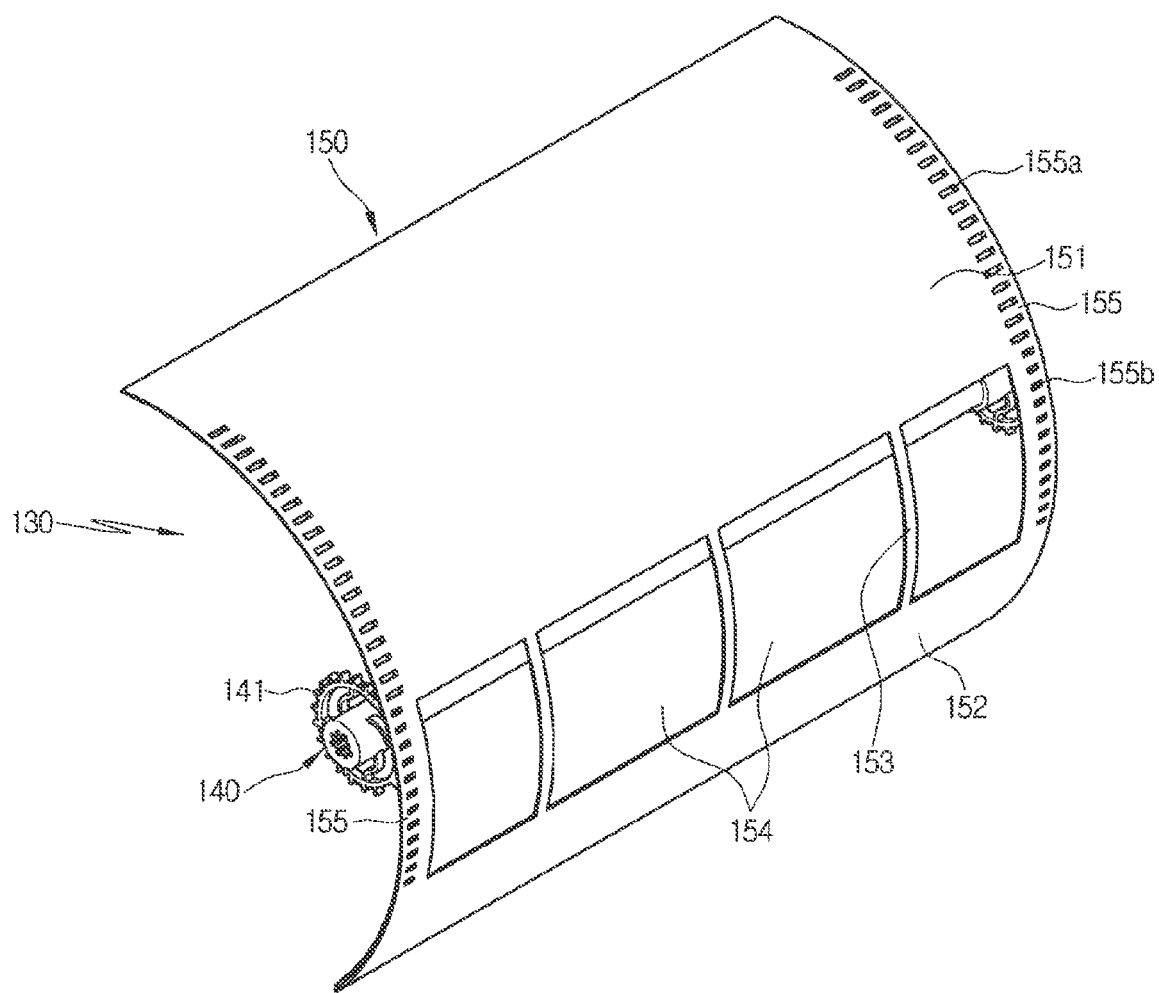
Figure 6:
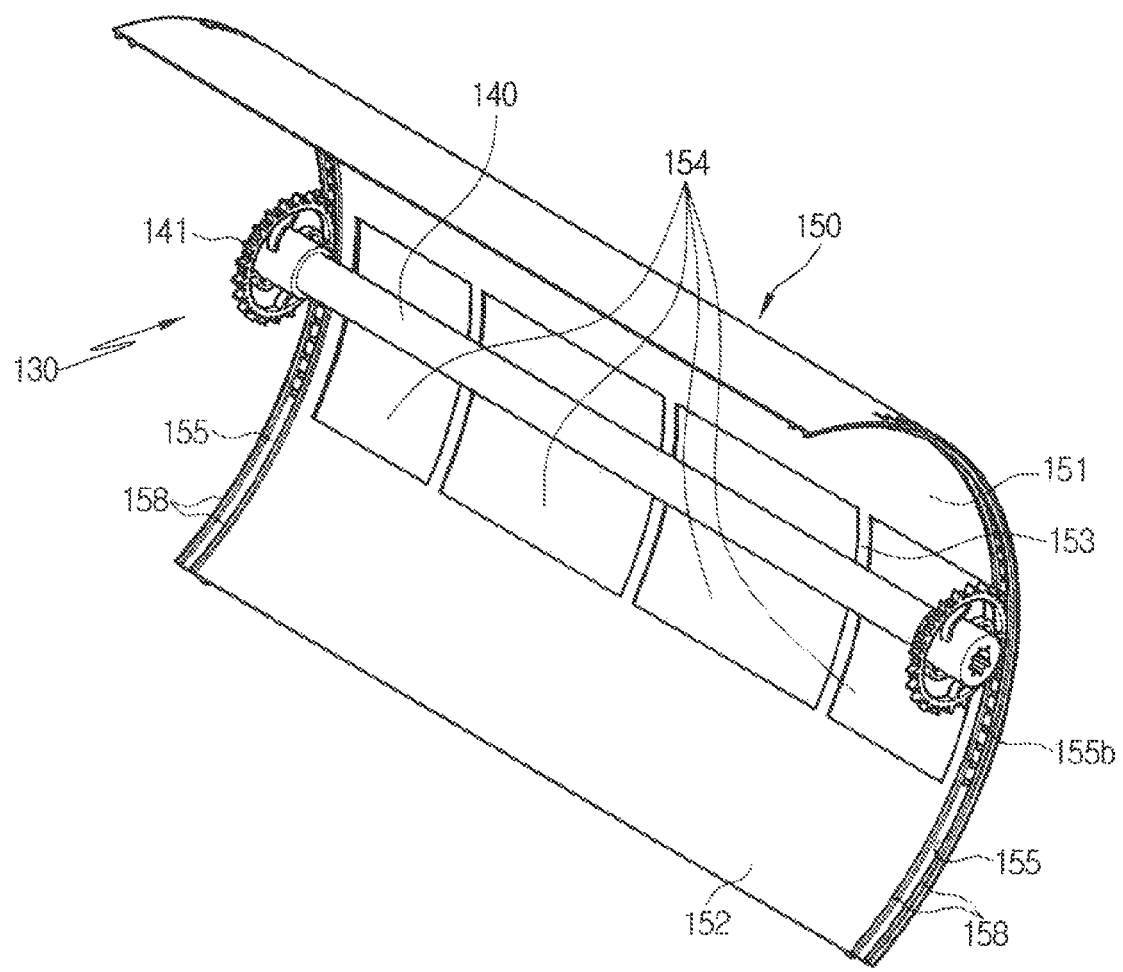
Figure 7:
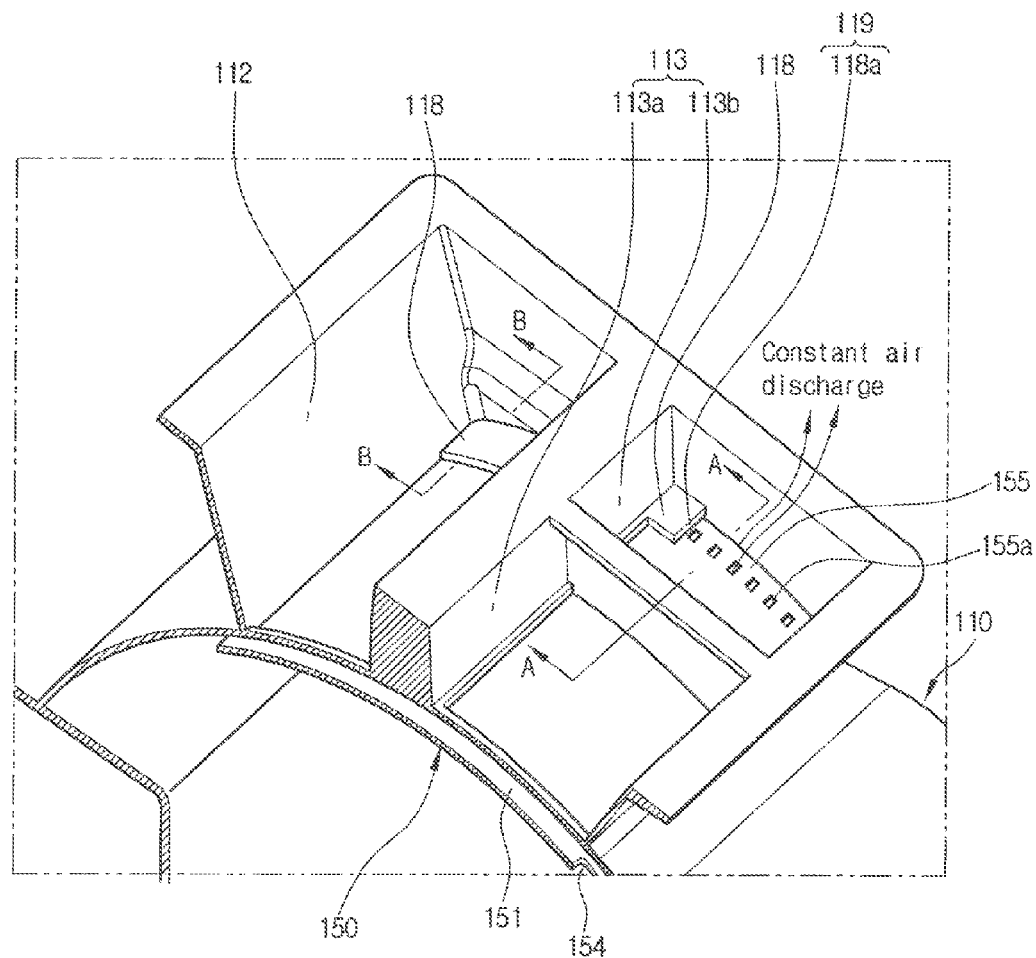
FIG. 7 is a partially perspective view showing an upper portion of the air-conditioning case of the air conditioner for the vehicle according to the present invention.

Accordingly, as shown in FIG. 5, it is preferable that the gear hole 155a formed on the side rail portion 155 of the first door portion 151 is larger in area than the gear hole 155b formed on the side rail portion 155 of the opening portion 154.

In this instance, when the gear hole 155a of the first door portion 151 is wider than the gear hole 155b of the opening portion 154, the gear hole 155a smoothly engages with the gear portion 141 of the gear shaft 140 so as to secure a flow path for constantly discharging air.

Here, it is preferable that the width of the gear hole 155a of the first door portion 151 extends in a perpendicular direction (parallel with the gear shaft) to the sliding direction of the thin plate member 150.

As described above, the gear hole 155a formed on the side rail portion 155 of the first door portion 151 is larger than the gear hole 155b formed on the side rail portion 155 of the opening portion 154, so that the gear hole 155a can smoothly serve the power transfer function by engaging with the gear portion 141 of the gear shaft 140 and reduce a passageway resistance and increase air volume during the constant air discharge.

Figure 18:
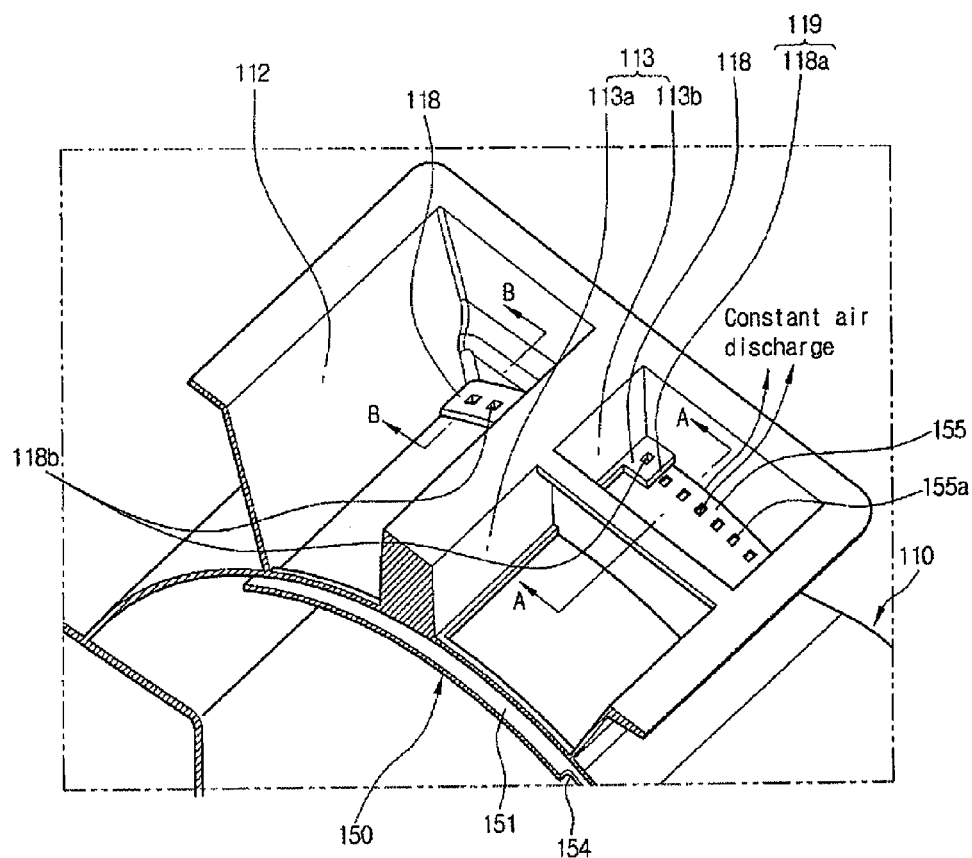
FIG. 18 is a partially perspective view showing an upper portion of the air-conditioning case of the air conditioner for the vehicle according to another embodiment of the present invention.

Moreover, as shown in FIG. 18, in another embodiment of the constant, discharging means 119, the constant discharging means 119 includes: a plurality of gear holes 155a and 155b formed on the rail portion 155 of the mode door 130 so as to engage with the gear portion 141 of the gear shaft 140; and a plurality of through holes 118b formed on the guide part 118 of the air-conditioning case 110 corresponding to the plural gear holes 155a and 155b, wherein air passing through the gear holes 155a and 155b and the through holes 118b is constantly discharged toward one vent.

In other words, instead of the cut portion 118a formed on the guide part 118 of the air-conditioning case 110, the through holes 118b corresponding to the plural gear holes 155a and 155b formed on the guide part 118 may serve the constant air discharging function.

Meanwhile, the temperature-adjusting door 120 mounted between the evaporator 101 and the heater core 102 may include the gear shaft 121 and the thin plate member 122 as in the mode door 130 in order to reduce the size of the air conditioner 100. That is, the temperature-adjusting door 120 includes: a gear shaft 121 rotating by an actuator (not shown); and a thin plate member 122 engaging with the gear shaft 121 for adjusting the degree of opening of the cold, air passageway P1 and the warm air passageway P2 while vertically sliding inside the air-conditioning case 110 when the gear shaft 121 rotates.

Hereinafter, each air discharge mode of the air conditioner for the vehicle according to the present invention will be described, and for convenience's sake, will be described based on a cooling mode.

A. Vent Mode

Figure 13:
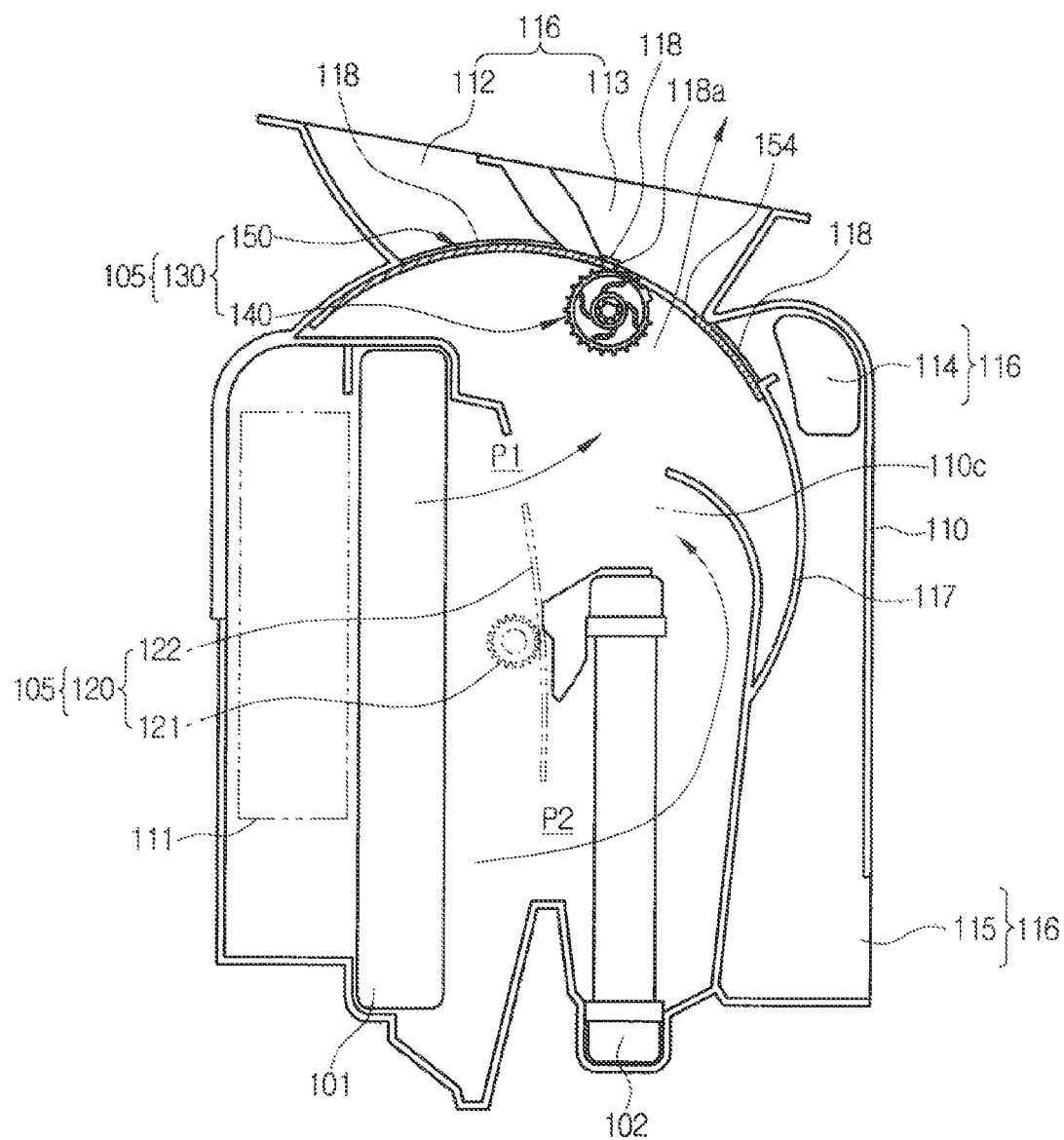
FIGS. 13 to 17 are views showing an operational state of the mode doors by each air discharge mode in the air conditioner for the vehicle according to the present invention.

As shown in FIG. 13, in the vent mode, by the rotation of the gear shaft 140, the first door portion 151 closes the defrost vent 112 and the second door portion closes the floor vents 114 and 115, and in this instance, the opening portion of the thin plate member 150 opens the face vent 113 while being located at the face vent 113.

Accordingly, the air blown by an air blower is changed into cold air while passing through the evaporator 101.

The cold air cooled while passing through the evaporator 101 bypasses the heater core 102 by the temperature-adjusting door 120, and then, is discharged toward a passenger's face inside the vehicle through the face vent 113 opened by the thin plate member 150.

B. Floor Mode

As shown in FIG. 14, in the floor mode, when the gear shaft 140 rotates at a predetermined angle in the clockwise direction at the vent mode position, the first door portion 151 of the thin plate member 150 closes the defrost vent 112 and the face vent 113 at the same time, and in this instance, the opening portion 154 of the thin plate member 150 opens the floor vents 114 and 115 while being located at the floor vents 114 and 115.

Here the second door portion 152 lowers to a position where the second door portion 152 is overlapped with the partition wall 115.

Therefore, the air blown by the air blower is changed into cold air while passing through the evaporator 101.

The cold air cooled while passing through the evaporator 101 bypasses the heater core 102 by the temperature-adjusting door 120, and then, is discharged toward the passenger's feet inside the vehicle through the floor vents 114 and 115 opened by the thin plate member.

C. Defrost Mode

As shown in FIG. 15, in the defrost mode, when the gear shaft 140 is additionally rotated at a floor mode position to a predetermined angle in the clockwise direction, the first door portion 151 of the thin, plate member 150 closes the face vent 113 and the floor vents 114 and 115 at the same time, and in this instance, the defrost vent 112 is opened because the first door portion 151 is deviated from the defrost vent 112.

Here, the second door portion 152 and the opening portion 154 lower to the position where they are overlapped with the partition wall 115.

Accordingly, the air blown by the air blower is changed into cold air while passing through the evaporator 101.

The cold air cooled while passing through the evaporator 101 bypasses the heater core 102 by the temperature-adjusting door 120, and then, is supplied toward windows inside the vehicle through the defrost vent 112 opened by the thin plate member 150 so as to defrost.

D. Bi-Level Mode & Mix Mode

Figure 16:
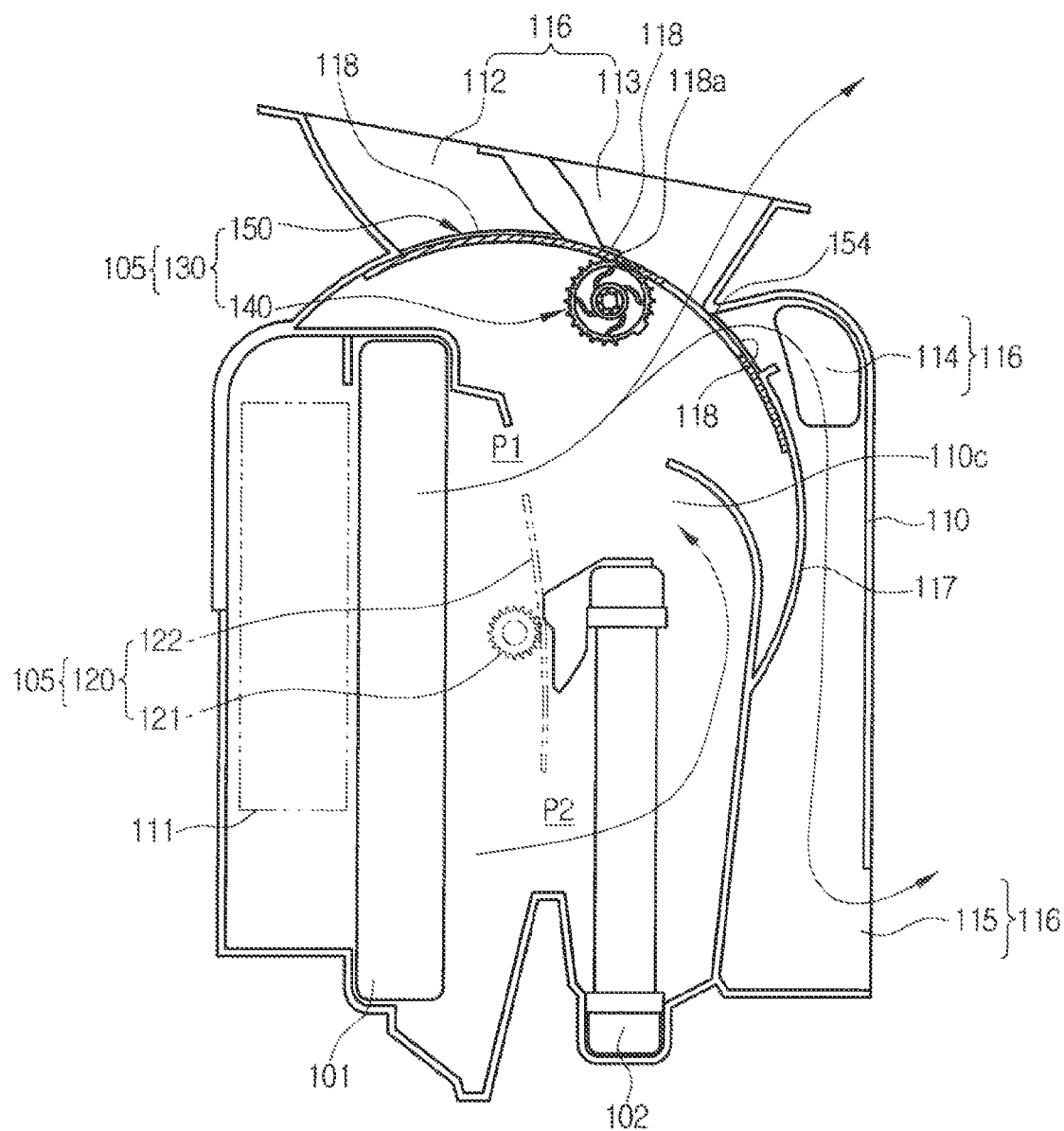

Referring to FIG. 16, the bi-level mode will be described in brief. The bi-level mode is a mode that the face vent 113 and the floor vents 114 and 115 are opened at the same time when the opening portion 154 of the thin plate member 150 spans between the face vent 113 and the floor vents 114 and 115.

Referring to FIG. 17, the mix mode when the center of the first door portion 151 of the thin plate member 150 is located at the face vent 113, the face vent 113 is closed and the defrost vent 112 and the floor vents 114 and 115 are opened at the same time.

Because the gear holes 155a and 155b of the thin plate member 150 are opened by the cut portion 118a formed on the guide part 118 without regard to the air discharge mode, air is constantly discharged to the side vents 113b of the face vent 113.

As described above, while the structure that the cut portion 118a is formed on the guide part 118 of the side vent 113b of the face vent 113 and the gear holes 155a and 155b is formed in the thin plate member 150 opened by the cut portion 118a so as to constantly discharge air toward the side vent 113b through the gear holes 155a and 155b is applied to the semi-center type air conditioners, the present invention is not restricted to the above, but may be applied to various kinds of air conditioners, such as center-mounting type air conditioners, three-piece type air conditioners, independent type air conditioners, and other type air conditioners, in the same way, and it can provide the same effects as the structure applied to the semi-center type air conditioners.

What is claimed is:

1. An air conditioner for a vehicle comprising:
an air-conditioning case having an air inflow port formed on one side thereof and a defrost vent, a face vent and floor vents respectively formed on the other side thereof for discharging the air, which is introduced through the air inflow port;
a mode door having a gear shaft, which is rotatably mounted inside the air-conditioning case and has gear portions, and a thin plate member, which is slidably mounted adjacent to the vents inside the air-conditioning case and has rail portions engaging with the gear portions of the gear shaft, for controlling the degree of opening of the vents;
a guide part formed on an inner face of the air-conditioning case to cover the rail portions and overlapped with the rail portions of the thin plate member; and
constant discharging means formed on the rail portions of the mode door and the guide part of the air-conditioning case so as to continuously discharge the inside air of the air-conditioning case toward one vent out of the vents;
wherein the constant discharging means comprises aplurality of gear holes formed on the rail portions of the mode door so as to engage with the gear portions of the gear shaft; and cut portions formed on the guide part of the air-conditioning case by cutting a predetermined section of the guide part in a sliding direction of the thin plate member, so that air passing through the gear holes and the cut portions is continuously discharged to the one vent.

2. The air conditioner according to claim 1, wherein the face vent comprises a center vent formed at the center of the inside thereof and side vents formed at both sides of the center vent, and the cut portions are formed on the guide part formed at the side vent of the face vent.

3. The air conditioner according to claim 1, wherein a gap is formed between an inner face of the air-conditioning case and the rail portion, such that the inside air of the air-conditioning case is continuously discharged through the gap and the cut portion.

4. The air conditioner according to claim 3, wherein rail groove portions are formed on the inner face of the air-conditioning case in the sliding direction of the thin plate member so as to slidably support end portions of the rail portion, and through holes are formed in a side of the rail groove portion corresponding to the inner area of the cut portion, such that the inside air of the air-conditioning case is continuously discharged also through the through holes, the gap and the cut portions.

5. The air conditioner according to claim 1, wherein rail groove portions are formed on the inner face of the air-conditioning case in the sliding direction of the thin plate member so as to slidably support end portions of the rail portion, and the rail groove portions are formed only in an outer area of the cut portion.

6. The air conditioner according to claim 1, wherein the thin plate member comprises: an opening portion for selectively opening the face vent according to an air discharge mode; a first door portion disposed at one side of the opening portion for selectively closing the face vent; and gear holes formed on the rail portions formed on sides of the first door portion and the opening portions.

7. The air conditioner according to claim 6, wherein the gear hole formed on the side rail portion of the first door portion is larger than the gear hole formed on the side rail portion of the opening portion.

8. The air conditioner according to claim 6, wherein the thin plate member further comprises a second door portion disposed on the other side of the opening portion for selectively closing the floor vents according to the air discharge mode, the second door portion not having any gear holes in the rail portions disposed at both end portions thereof.

9. The air conditioner according to claim 1, wherein the constant discharging means further comprises: a plurality of through holes formed on the guide part of the air-conditioning case corresponding to the plurality of gear holes, such that the air passing through the gear holes and the through holes is continuously discharged to a respective vent.

10. The air conditioner according to claim 1, wherein the gear shaft, the thin plate member and the guide part are arranged in order in an air flow direction inside the air-conditioning case.

11. The air conditioner according to claim 1, wherein the face vent comprises a center vent formed at the center of the inside thereof and side vents formed at both sides of the center vent, and the rail portions are formed at both end portions of the thin plate member.

12. The air conditioner according to claim 1, wherein the face vent comprises a side vent formed at the center of the inside thereof and center vents formed at both sides of the side vent, and the rail portions are formed at both sides of the side vent.

* * * * *